(12) United States Patent
Chambers

(10) Patent No.: US 6,256,497 B1
(45) Date of Patent: Jul. 3, 2001

(54) INTERWORKING BETWEEN TELECOMMUNICATIONS NETWORKS

(75) Inventor: Paul Chambers, Buckinghamshire (GB)

(73) Assignee: ICO Services LTD, London (GB)

( * ) Notice: Subject to any disclaimer, the term of this patent is extended or adjusted under 35 U.S.C. 154(b) by 0 days.

(21) Appl. No.: 09/046,673

(22) Filed: Mar. 24, 1998

(30) Foreign Application Priority Data

Apr. 1, 1997 (EP) ................................. 97302222

(51) Int. Cl.$^7$ ........................................ H04Q 7/20
(52) U.S. Cl. .......................... 455/433; 455/560; 455/432; 455/435; 455/445
(58) Field of Search .................... 455/414, 435, 455/445, 561, 450, 454, 560, 432, 433

(56) References Cited

U.S. PATENT DOCUMENTS

| 5,394,561 | 2/1995 | Freeburg | 455/428 |
|---|---|---|---|
| 5,412,375 | 5/1995 | Wood | 455/451 |
| 5,495,484 | * 2/1996 | Self et al. | 370/338 |
| 5,864,579 | * 1/1999 | Briskman | 455/13.1 |
| 5,884,169 | * 3/1999 | Uchiyama et al. | 455/433 |
| 5,884,170 | * 3/1999 | Valentine et al. | 455/433 |
| 5,901,352 | * 5/1999 | St-Pierre et al. | 455/435 |

FOREIGN PATENT DOCUMENTS

| 0 365 885 | 10/1989 | (EP) | H04B/7/204 |
|---|---|---|---|
| 0 510 789 | 1/1992 | (EP) | B64G/1/10 |
| 0 712 215 | 5/1996 | (EP) | H04B/7/185 |
| 0 758 835 A2 | * 2/1997 | (EP) | H04Q/7/38 |
| 2 288 913 | 11/1995 | (GB) | H01Q/3/40 |
| 2 293 725 | 4/1996 | (GB) | H04B/7/185 |
| 2 295 296 | 5/1996 | (GB) | H04B/7/185 |
| 9301493 | 3/1995 | (NL) | H04Q/7/20 |
| WO 95/10925 | * 4/1995 | (WO) | H04Q/11/00 |
| 96/28947 | 9/1996 | (WO) | H04Q/7/38 |
| WO 96/32820 | * 10/1996 | (WO) | H04Q/3/00 |

OTHER PUBLICATIONS

"Globel Networking Model for Enhanced Services Represented by UPT", M. Fujioka et al., IEICE Transactions, vol. E74, No. 11, Nov. 1, 1991, pp. 3705–3718.

"Personal Communications Service–Concept and Architecture", J. Nguyen et al., Gateway To The Future–Technology In Motion, St. Louis, May 19–22, 1991, Institute of Electrical and Electronics Engineers, pp. 393–398.

"Intelligent Network: A Key Platform for PCS Interworking and Interoperability", S.S. Husain et al., IEEE Communications Magazine, vol. 34, No. 9, Sep. 1996, pp. 98–105.

Walker, J.G. "Satellite Patterns for Continuous Multiple Whole–Earth Coverage", International Conference on Maritime and Aeronautical Satellite Communication and Navigation, Mar. 1978, pp. 119–122.

Mouly, M. et al. "The GSM System for Mobile Communications", pp. 477–492.

* cited by examiner

Primary Examiner—William G. Trost
Assistant Examiner—Rafael Pierez-Gutierrez
(74) Attorney, Agent, or Firm—McDermott, Will & Emery

(57) ABSTRACT

A mobile telephone (UT 1) is configured for dual mode operation, so as to communicate either via an earth-orbiting satellite 3a with a satellite network (SAN 1) or through a conventional land-based cellular network (PLMN 9). In order to provide interworking between the satellite network and the land, cellular network 9, an interworking function (IWF 31) provides data to the cellular network 9 concerning the location of the user terminal (UT 1) in relation to the satellite network. The data is transmitted from the satellite visitor location register (VLR$_{SAT}$ 1) to the home location register (HLR) of the cellular network 9. The IWF maintains a list of roaming subscribers provisioned with services which are specific to the visited network and not available in the home network. The (IWF 31) is configured to operate with local GSM, DAMPS, PHS or other local land-based networks, depending on the geographic location of the SAN.

7 Claims, 6 Drawing Sheets

INTERWORKING BETWEEN TELECOMMUNICATIONS NETWORKS

FIELD OF THE INVENTION

This invention relates to the provision of interworking between first and second telecommunication networks for use with mobile user terminals. The invention has particular but not exclusive application to providing an interworking function between a satellite telecommunication network and a cellular telephone network for providing telecommunication coverage to mobile user terminals, such as mobile telephone handsets.

BACKGROUND

Terrestrial mobile telecommunications systems are well known and a number of different systems have developed which operate according to different standards. These public land mobile networks (PLMNs) may operate according to analogue or digital standards. In Europe, the Far East, excluding Japan and elsewhere, the Global System Mobile (GSM) network has become popular, whereas in USA, the Advanced Mobile Phone Service (AMPS) and the Digital American Mobile Phone System (DAMPS) are in use, and in Japan, the Personal Handiphone System (PHS) and the Personal Digital Communication (PDC) network are used. More recently, proposals have been made for a Universal Mobile Telecommunications System (UMTS). These networks are all cellular and land-based with transmitter/receivers which communicate with mobile user terminals. Considering for example the GSM system, individual cells of the mobile network are served by a series of geographically spaced, terrestrial base transceiver stations (BTSs) which are coupled through base station controllers (BSCs) to a mobile switching center (MSC) which may provide a gateway out of the network to a conventional public switched telephone network (PSTN). The PLMN includes a home location register (HLR) which stores information about the subscribers to the system and their user terminals. When a user terminal is switched on, it registers with the HLR. If the user roams to a different GSM network, the user terminal registers with a visitor location register (VLR) of the visited network, which communicates with the HLR of the home network for routing and other purposes. DAMPS, PHS and PDC networks include similar location registers. More recently, a number of different mobile telecommunication systems have been proposed that use satellite communication links to the mobile user terminals.

One network known as the IRIDIUM™ satellite cellular system is described in for example EP-A-0365885 and U.S. Pat. No. 5,394,561 (Motorola), which makes use of a constellation of so-called low earth orbit (LEO) satellites, that have an orbital radius of 780 km. Mobile user terminals such as telephone handsets are configured to establish a link to an overhead orbiting satellite, from which a call can be directed to another satellite in the constellation and then typically to a ground station which is connected to conventional land-based networks.

Alternative schemes which make use of so-called medium earth orbit (MEO) satellite constellations have been proposed with an orbital radius in the range of 10–20,000 km and reference is directed to Walker J. G. "Satellite Patterns for Continuous Multiple Whole Earth Coverage" Royal Aircraft Establishment, pp 119–122 (1977). These orbits are also known as intermediate earth orbits (IEOs). As examples, reference is directed to the ICO™ satellite cellular system described for example in GB-A-2 295 296, and to the ODYSSEY™ satellite cellular system described in EP-A-0 510 789. With both the ICO™ and the ODYSSEY™ systems, the satellite communication link does not permit communication between adjacent satellites and instead, a signal from a mobile user terminal such as a mobile handset is directed firstly to the satellite and then directed to a ground station or satellite access node (SAN), connected to conventional land-based telephone network. This has the advantage that many components of the system are compatible with known digital terrestrial cellular technology such as GSM.

In satellite communications networks, ground stations are located at different sites around the world in order to communicate with the orbiting satellites. In the ICO™ system and others, a visitor location register is associated with each of the satellite ground stations, which maintains a record of the individual user terminals that are making use of the particular ground station.

In certain areas of the world, coverage provided by a conventional terrestrial PLMN and the satellite network will overlap. It has been proposed that the individual mobile terminals be selectively operable with either a terrestrial PLMN or the satellite network. The user terminals may include a switch to allow the user to select the network or alternatively, an automatic selection may be made e.g. on the basis of signal strength or other factors. Thus, the user of the terminal can use the satellite network as a roamed network, with billing and other usage information being passed back to the Home PLMN for billing to the customer. It is envisaged that normally, the conventional terrestrial PLMNs will be preferred when available, for reasons of cost and signal strength. Nevertheless in some circumstances, the satellite network may provide services which are not available through the Home PLMN and so it would be desirable to establish service interworking between the networks so that roaming users from terrestrial PLMNs may make use of unique services provided by the satellite network, when they roam onto the satellite network.

SUMMARY OF THE INVENTION

In accordance with the invention there is provided apparatus for interworking between first and second telecommunications networks for use with mobile user terminals, in which the first network provides a first telecommunications service and includes register of subscribers for the network and the location of their user terminals with respect to the first network, and the second network provides a second telecommunications service and includes at least one visitor register which records the presence of user terminals in the second network, the interworking apparatus comprising: interworking register means to provide interworking data including: data concerning user terminals currently registered for use with the second network, and data for determining whether particular subscribers are permitted to use the second service provided by the second network; means responsive to requests from the first network to determine from said interworking data, routing information for a particular user terminal currently registered in the second network; and means responsive to requests from the second network to determine from the interworking data whether the user can make use of the second service.

The invention also includes a method of interworking between first and second telecommunications networks for use with mobile user terminals, in which the first network provides a first telecommunications service and includes a register of subscribers for the network and the location of their user terminals with respect to the first network, and the second network provides a second telecommunications service and includes at least one visitor register which records the presence of user terminals in the second network, the method including: providing interworking data in an interworking unit, that includes: data concerning user terminals currently registered for use with the second network, and data for determining whether particular subscribers are permitted to use the second service provided by the second network; and interrogating the interworking unit to determine from said interworking data whether a call can be routed to a particular user terminal from the first network through the second network, making use of the second service.

The first network may comprise a cellular telecommunications network with a home location register for subscribers to the first network, and the second network may comprise a satellite telecommunications network with satellite access nodes each having a visitor location register for registering subscriber user terminals for the second network, and the method may include communicating data from the visitor location registers of the second network to the interworking unit.

The second service provided by the second network may comprise providing a temporary signal for communicating with the user terminal at a power greater than that used for the normal telecommunications traffic with the terminal, so as to establish communication therewith, and the method includes establishing communication with the terminal with said high power signal through the second network.

The invention furthermore includes first and second telecommunications networks for use with mobile user terminals, configured for interworking, wherein the first network provides a first telecommunications service and includes register of subscribers for the network and the location of their user terminals with respect to the first network, and the second network provides a second telecommunications service and includes a plurality of visitor registers which record the presence of user terminals in different parts of the second network, the network configuration including interworking means for providing to the first network, interworking data concerning the registration of a particular subscriber user terminal with a visitor location register of the second network.

BRIEF DESCRIPTION OF THE DRAWINGS

In order that the invention may be more fully understood an embodiment thereof will now be described by way of example with reference to the accompanying drawings, in which.

DETAILED DESCRIPTION

Figure 1:
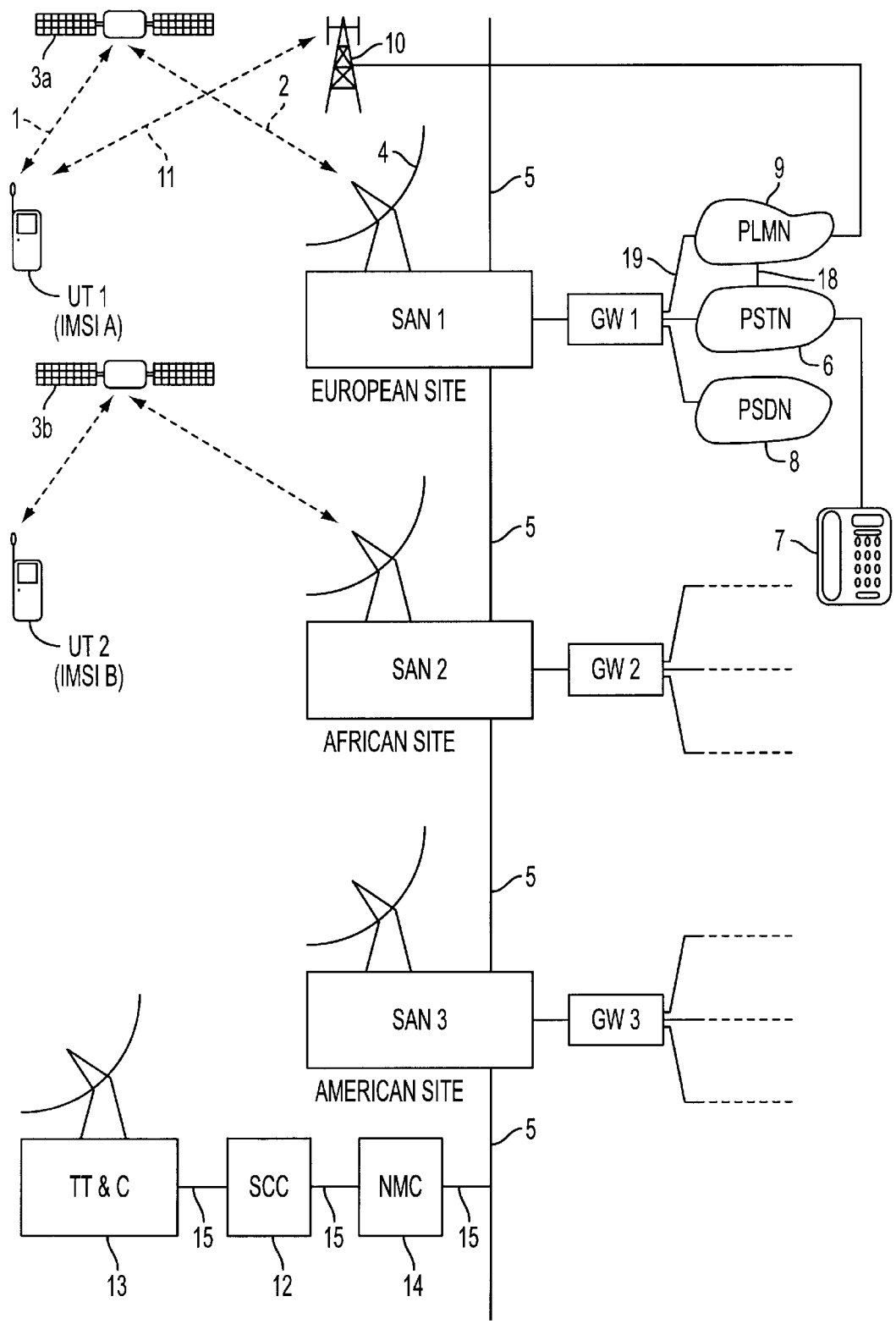
FIG. 1 is a schematic diagram of a satellite telecommunications system together with a local, land-based mobile telecommunications system, in accordance with the invention.

Referring to FIG. 1, a schematic block diagram of a satellite mobile telecommunication network is shown corresponding to the ICO™ network. A mobile user terminal UT 1 in the form of a mobile telephone handset can communicate on a radio channel over a communication path 1, 2 via an earth orbiting satellite 3a with a land-based satellite access node SAN 1. As shown schematically in FIG. 1, SAN 1 is provided with an antenna 4 which can track the orbiting satellite.

A number of the satellite access nodes SAN 1, 2, 3, etc are connected together to form a backbone network 5, which is connected through a number of gateways GW 1, 2, 3, etc to conventional land-based telephone networks. For example, considering the gateway GW 1, it is connected to a land-based public switch telephone network (PSTN) 6, which permits connection to be made to a conventional telephone set 7. The gateway GW 1 is additionally connected to a public switch data network (PSDN) 8 and a public local mobile network (PLMN) 9. Each of the gateways GW 1, 2, 3 may comprise existing International Switching Centers (ISCs) or mobile switching centers (MSCs) of the type used in GSM mobile networks.

As shown in FIG. 1, the handset UT 1 can also communicate with the conventional land-based mobile network PLMN 9, which is shown schematically to include a transceiver station 10 that establishes a duplex link 11 with the user terminal UT 1. In this example, the PLMN 9 is a GSM network.

For a fuller understanding of GSM, reference is directed to the various GSM Recommendations issued by the European Telecommunications Institute (ETSI). Also reference is directed to "The GSM System for Mobile Communications" by M. Mouly and M-B. Pautet, 1992 Cell & Sys, 1992, ISBN: 2-9507190-0-7 for a more readable overview.

The satellite network is designed to provide worldwide coverage and the satellites 3a, 3b form part of a constellation of satellites, which may be arranged in several orbits. In one example, two orbits of five satellites are used, which can be shown to provide coverage of a major part of the surface of the earth, in which for a 10° satellite elevation angle, one satellite can be accessed by the mobile handset all of the time and two satellites can be accessed for at least 80% of the time, thereby providing system redundancy. Additional satellites may be included in the constellation in order to provide further redundancy.

The satellites may be arranged in a MEO constellation, for example with an orbital radius of 10,355 km, although the invention is not restricted to a particular orbital radius. In this embodiment, satellites 3a, 3b are shown in a common orbit and the satellites are tracked by the antenna arrangement of each SAN. The SANs are spaced around the earth in order to provide continuous coverage. In the example shown, SAN 1 may be located in Europe whereas SAN 2 may be located in Africa, SAN 3 in America and other SANs may be located elsewhere. In FIG. 1, the SAN 2 is shown communicating with user terminal UT 2 via satellite 3b. For further details of the network, reference is directed to GB-A-2 295 296.

The satellites 3a, 3b are in non-geostationary orbits and comprise generally conventional satellites such as the Hughes HS 601. They may include features disclosed in GB-A-2 288 913. Each satellite 3a, 3b is arranged to generate an array of radio beams covering a footprint on the earth beneath the satellite, each beam including a number of different frequency channels and time slots as described in GB-A-2 293 725. The beams thus provide adjacent cellular areas which correspond to the cells of a conventional land-based mobile telephone network. The satellites are controlled by means of a satellite control center (SCC) 12 and a telemetry tracking and control station (TT&C) 13, which are connected to a network management center 14 through a digital network 15 that is coupled to the backbone network 5. The SCC 12 and the TT&C 13 control operations of the satellites 3a, 3b, e.g. for setting the transmission power levels and transponder input tuning, as directed by the NMC 14. Telemetry signals for the satellites 3a, 3b are received by the TT&C 13 and processed by the SCC 12 to ensure that the satellites are functioning correctly.

During a telephone call, the handset UT 1, 2 communicates with the satellite 3a, 3b via a full duplex channel comprising a down link channel and an up link channel. The channels include TDMA time slots on frequencies allocated on initiation of the call.

Figure 2:
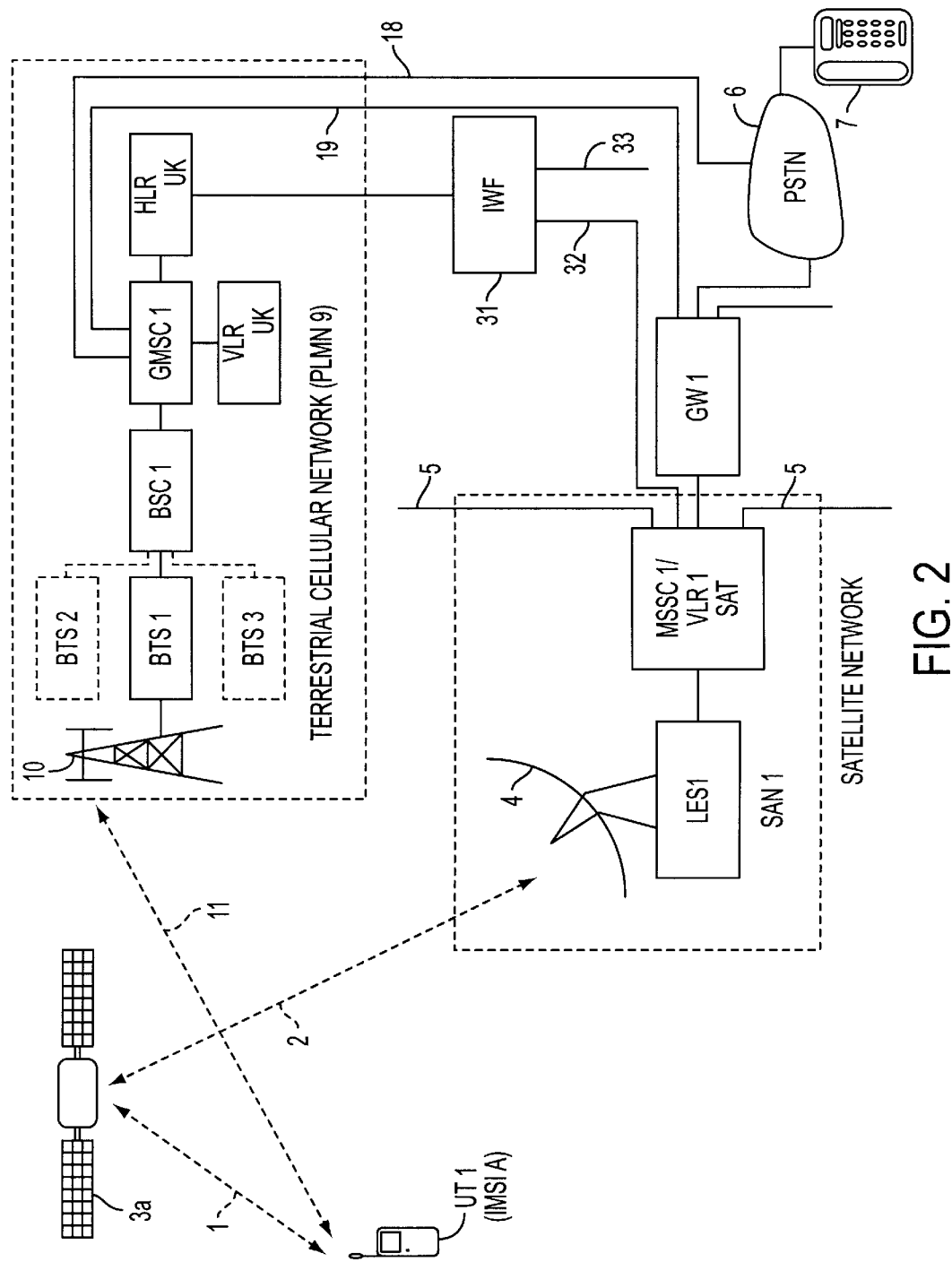
FIG. 2 is a more detailed block diagram of the satellite network in the vicinity of SAN 1 and the associated terrestrial cellular network, for illustrating interworking.

Referring to FIG. 2, the configuration of SAN 1 and the local PLMN 9 is shown in more detail. SAN 1 consists of a land earth station LES 1 which is coupled to the five dish antennas 4 for tracking the satellites, the LES 1 including transmitter and receiver circuits with amplifiers, multiplexers, demultiplexer and codecs. A mobile satellite switching center MSSC 1 is coupled to LES 1 and includes a satellite visitor location register $VLR_{SAT}$ 1. MSSC 1 couples communication signals to the backbone network 5 and to the LES 1, so as to allow individual telephone calls to be established through the backbone network 5 and the duplex communication link 1, 2 via the satellite 3a, to the mobile terminal UT 1.

Also, MSSC 1 is connected to the gateway GW 1 so as to provide an output connection to PLMN 9, together with PSDN 8 and PSTN 6 shown in FIG. 1. It will be understood that all the SANs are of similar construction with a respective $VLR_{SAT}$ to maintain a record of the subscribers registered.

The $VLR_{SAT}$ 1 maintains a record of each of the subscribers currently registered, namely the identity of each user that is making use of the SAN 1 for signal communication.

The MSSC 1 responds to addresses on incoming communication signals from the antenna 4 to route the signals appropriately to their destinations.

SERVICE PROVISION

The network configuration permits service providers to offer services to a subscriber in a number of different ways. One way is to provide a solely satellite based service, provided through the backbone network 5 and the SANs. An alternative way is to provide the satellite based service as an extension of the PLMN 9 so that the user of terminal UT 1 uses the Home PLMN 9 when in range, other PLMNs when roaming in respect of land-based networks, or alternatively the satellite network. Thus, the satellite network can allow the user terminal to be operated worldwide, outside of the range of terrestrial PLMNs, or the satellite service can provide an alternative to the PLMN when within range. These alternatives will now be described in detail:

a) Satellite Service Provision

Figure 3:
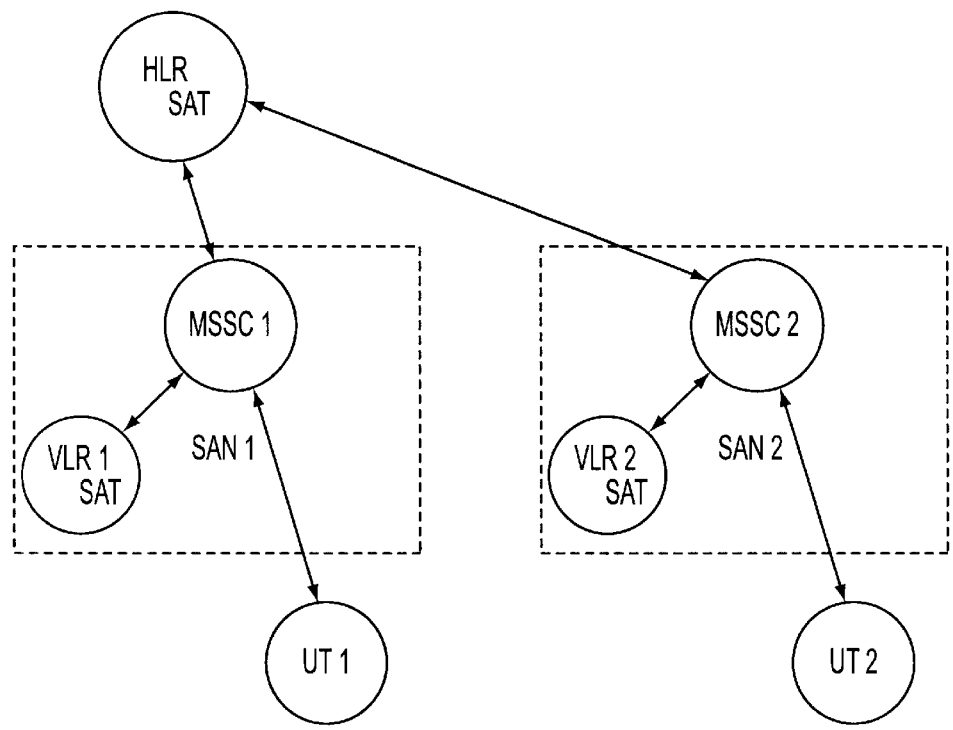
FIG. 3 is a schematic block diagram of data flows within the satellite network.

For this mode of operation, a "stand-alone" satellite service is provided through the backbone network 5. Referring to FIG. 3, the satellite service provision makes use of a database referred to herein as the satellite home location register ($HLR_{SAT}$) that contains records relating to each mobile user. The record includes the user's identity, which comprises a International Mobile Subscriber Identity (IMSI), the current status of the UT, and the currently registered location of the UT. The $HLR_{SAT}$ may be located at the NMC 14 shown in FIG. 1 or may be distributed among the SANs 1, 2, 3 etc.

Referring again to FIG. 1, when a call from telephone set 7 is to be routed through PSTN 6 to the satellite service, the satellite service network has a predetermined telephone number prefix, together with a unique telephone number for the user. The call is routed through PSTN and gateway GW 1 to SAN 1 in this example. The SAN 1 then queries the satellite home location register $HLR_{SAT}$ for the currently registered location of the user. This operates in the same way as a GSM HLR and the IMSI corresponding to the telephone number for the incoming call is determined from a look up table in the $HLR_{SAT}$. Also the HLR includes a table of the current location of the user terminals currently registered with the network, this information having been fed to the HLR from the $VLRs_{SAT}$ associated with the individual SANs. From this comparison, the call can then be routed to the relevant SAN with which the destination user UT is currently registered. The call is then routed through the SAN through an appropriate satellite link to the user terminal. Billing information is accumulated in the $HLR_{SAT}$.

As a specific example of the satellite service, a call made from telephone 7 can be routed to user terminal UT 2 having an IMSI B via PSTN 6, GW 1, SAN 1, SAN 2 and satellite 3b.

This form of service provision is attractive for users in remote locations where no PLMN exists.

(b) Satellite service as an extension to existing PLMN service

For this service provision, the satellite network is treated as an extension or roamed network for an existing PLMN. As will be explained in more detail, information concerning the location of user terminals is provided to the PLMN and billing data for use of the satellite service is carried out through the existing facilities of the PLMN. The user terminal may comprise a dual mode unit, for use with the PLMN and the satellite network and an example of such a system will now be described with reference to FIGS. 1 and 2 in connection with the user terminal UT 1.

Referring again to FIG. 2, the PLMN 9 in this example comprises a UK based GSM network and includes a number of base transceiver stations BTS 1, 2, 3 etc which are geographically spaced apart in order to support a cellular network in a manner well known per se. BTS 1 is shown with an associated antenna 10, connected by a landline to a base station controller BSC 1, it being understood that a plurality of BTSs are connected to BSC 1 in a manner well known per se. The BSC 1 is connected to a mobile switching center GMSC 1 which can route calls within the mobile network and also through a gateway to a conventional PSTN over line 18, in a manner well known per se or to the satellite network, over line 19 through the gateway GW 1.

A home location register $HLR_{UK}$ for the land-based network 9 is provided coupled to the GMSC 1. The $HLR_{UK}$, in a conventional manner, keeps a record of the IMSIs of the users subscribing to the network 9. A visitor location register $VLR_{UK}$ maintains a record of subscribers temporarily registered with the network. For example, with the PLMN 9 sited in the UK, subscribers to GSM networks in another country e.g. Germany may be locally registered on a temporary basis whilst in the UK. In a conventional manner, telephone usage information is relayed from the $VLR_{UK}$ and GMSC 1 to the German network (not shown) for billing purposes.

Figure 4:
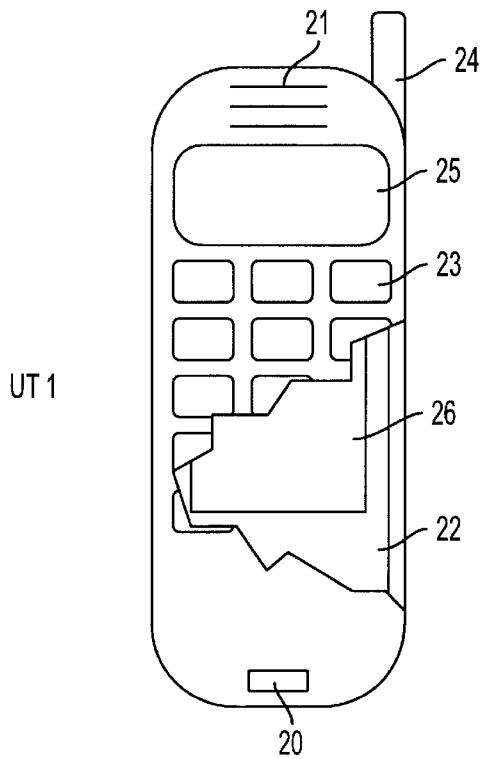
FIG. 4 is a schematic diagram of a mobile user terminal.
Figure 5:
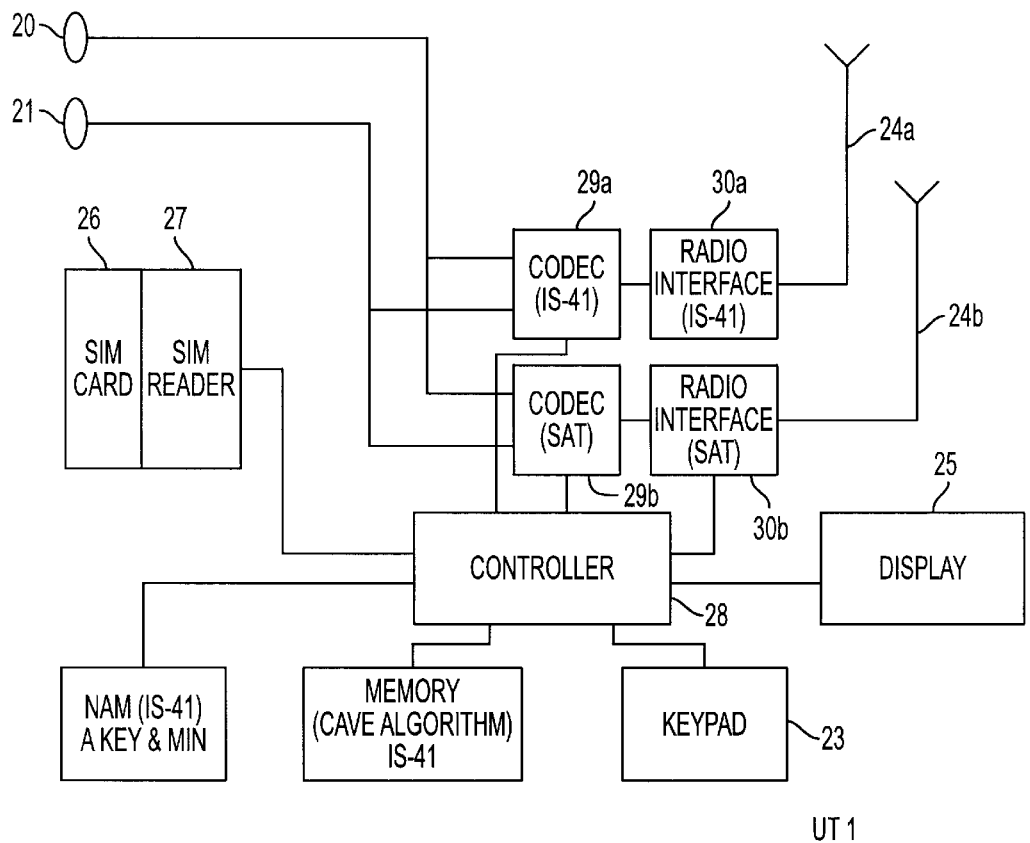
FIG. 5 is a schematic block diagram of the circuits of the user terminal shown in FIG. 4.
Figure 6:
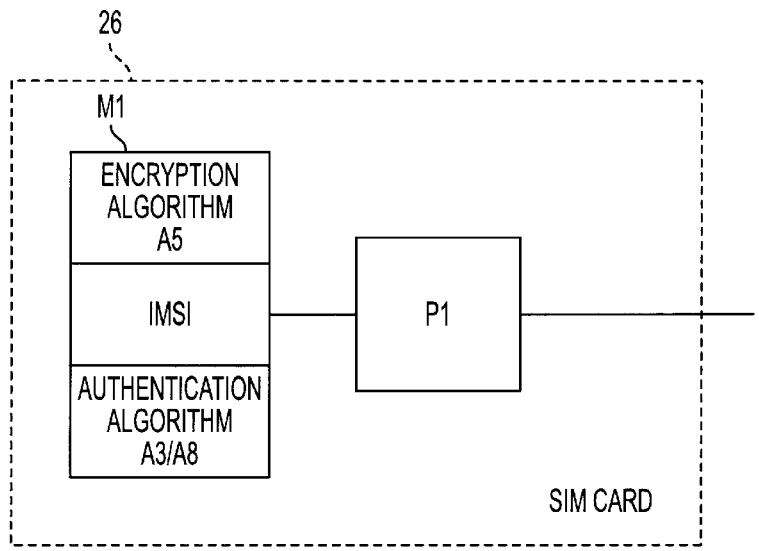
FIG. 6 is a schematic block diagram of the SIM card shown in FIGS. 4 and 5.

Referring to FIGS. 4 and 5, the mobile user terminal UT 1 is configured to operate with both the local terrestrial cellular network and the satellite network. Thus, in the example shown in FIG. 2, the mobile handset UT 1 can operate either according to a land-based GSM protocol or according to the satellite network protocol. As shown in FIG. 4, the user terminal UT 1 comprises a mobile handset which is capable of dual mode operation. It includes conventional GSM circuits for use with the land-based cellular network 9 together with similar circuitry for use with the satellite network. A shown in FIG. 4, the handset comprises a microphone 20, a loudspeaker 21, a battery 22, a keypad 23, an antenna 24 and a display 25. The handheld unit UT 1 also includes a subscriber identification module (SIM) smartcard 26.

The circuit configuration of the handset UT 1 is shown in block diagrammatic form in FIG. 5. The SIM card 26 is received in an SIM card reader 27 coupled to a controller 28, typically a microprocessor. The microphone and loudspeaker 20, 21 are coupled to first and second codecs 29a, 29b coupled to a conventional radio interface 30a, 30b connected to the antenna 24a, 24b so as to transmit and receive communication signals, in a manner well known per se.

The SIM card 26 includes a memory M 1 which stores an IMSI, which is used both for the GSM network 9 and the satellite network. The memory also stores an encryption algorithm and an authentication algorithm, and a function Ki, for terminal identification and data encryption according to the GSM Recommendations supra. Thus, the UT can register with either network individually, according to conventional GSM registration techniques, which are well known in the art.

As previously described, the satellite and land-based networks may be selected automatically according to user determined criteria. However in this example, for simplicity, the satellite and land-based GSM networks are selected manually by use of a key on the keypad 23. When the GSM network is selected, the controller 28 sets the radio interface 30a to operate at a frequency suitable for the land-based GSM network and codec 29a, suitable for the GSM network, is selected. Alternatively, if the keypad 23 is operated to select the satellite network, the controller 28 operates to configure the radio interface 30b to a frequency and protocol appropriate for the satellite network, and codec 29b is selected, suitable for the satellite network. Thus, when the GSM network is selected, communication takes place over the duplex link 11 shown in FIG. 2, whereas when the satellite network is selected, communication takes place over the duplex links 1, 2 via the satellite 3a.

The routing of a call from the handset 7 (FIG. 2) to user terminal UT 1 will now be considered in detail.

When the user terminal UT 1 is registered with PLMN 9, the call is routed in a conventional manner through the terrestrial mobile network 9. However, when UT 1 is registered on the satellite network, the call is routed through SAN 1 to the user terminal UT 1 via the satellite 3a. Depending on which network has been selected, the user terminal UT 1 either registers with the $VLR_{UK}$ associated with PLMN 9 or, if the satellite network is selected, it is registered in $VLR_{SAT}$ 1 associated with SAN 1 shown in FIG. 2. The registration procedure corresponds to conventional GSM techniques and is described in more detail by Mouly and Pautet, supra. The registration procedure involves storing the IMSI associated with the user in the appropriate visitor location register VLR. Thus, IMSI A, for UT 1 is stored either in $VLR_{SAT}$ 1 or $VLR_{UK}$.

In accordance with this mode of operation, the IMSI and its corresponding VLR location is transmitted to the HLR of the PLMN 9. In this way, the HLR maintains a record of the location of the IMSI associated with user of the terminal UT 1 (IMSI A) so that the call can be routed accordingly.

Thus, considering the handset 7 shown in FIG. 2, in order to call the user terminal UT 1, the following telephone number is dialled: +44 935 123456. This is known as the Mobile Station Integrated Services Digital Network or MSISDN, and is a conventional telephone number; the prefix +44 corresponds to the country code for the United Kingdom; the code 935 is the access code for the GSM PLMN 9 and the numbers 123456 are an example of the telephone number for the user terminal UT 1. The telephone number is uniquely related to the IMSI A stored on the SIM card present in the user terminal UT 1.

When this number is dialled, the PSTN 6 routes the call initially over line 18 to the UK based GSM network 9 corresponding to access code 935. The MSISDN reaches GMSC 1 as shown at step S1 shown in FIG. 7.

Figure 7:
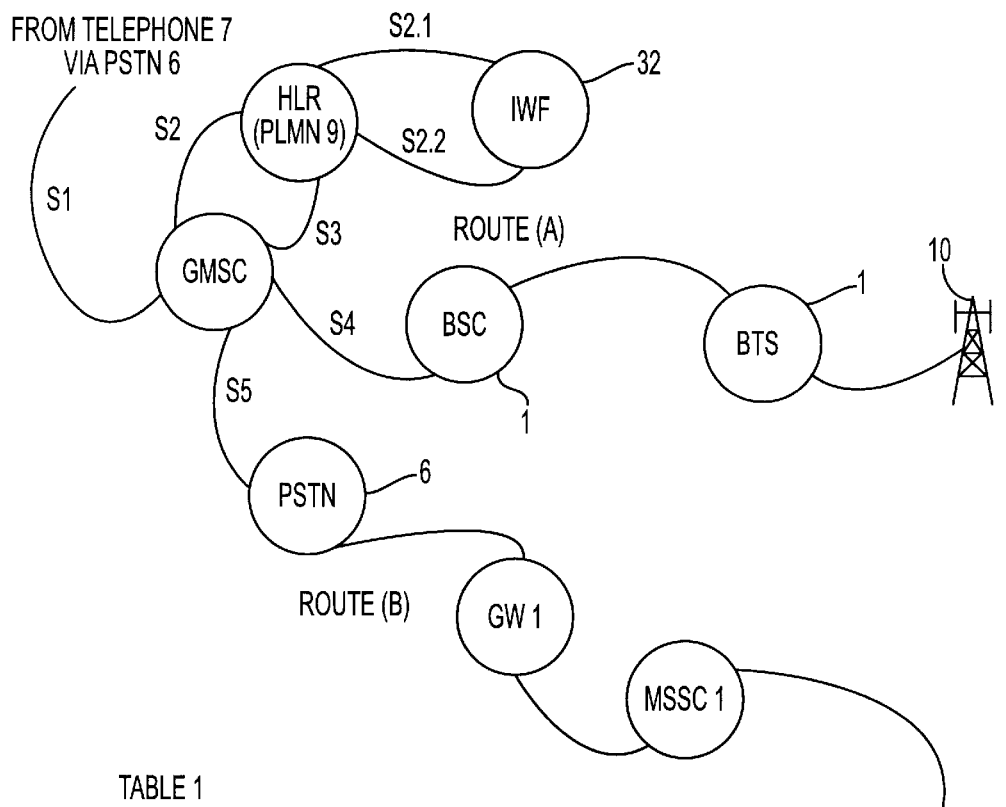
FIG. 7 is a schematic illustration of the routing of a call from telephone 7 through the PLMN to UT 1, either through the PLMN (route a) or through the satellite network (route b)
Figure 7:
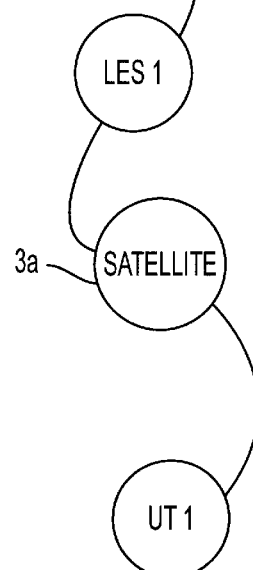

At step S2, the MSISDN is directed to $HLR_{UK}$ of PLMN 9 in order to access Tables 1 and 2 shown in FIG. 7. Table 1 is illustrative of data stored in $HLR_{UK}$. Each IMSI provisioned on this HLR, is stored along with its corresponding MSISDN(s). Also, details of the range of services to be made available to the subscriber is stored. For example, call forwarding data and other services may be provided to a subscriber selectively.

The $HLR_{UK}$ also includes data corresponding to Table 2 which provides data concerning the VLR with which a particular IMSI has been registered. In practice, Tables 1 and 2 form part of the same database but have been shown separately for ease of illustration. Thus, when the user terminal UT 1 has registered with PLMN 9 the Table corresponds to the Table 2a in which IMSI A has registered with the VLR for the PLMN 9, namely $VLR_{UK}$. Alternatively, when the satellite network has been selected, the user terminal UT 1 has registered with $VLR_{SAT}$ 1, as shown in Table 2b.

In step S3, the HLR returns a routing address for the user, to the GMSC, which then routes the call through the appropriate network. Assuming that the user terminal UT 1 has registered with the PLMN 9, the call is routed along route a shown in FIG. 7, through BSC 1, BTS 1, antenna 10 and communication link 11. However, if the user terminal UT 1 has registered with the satellite network, as shown in Table 2b, the $HLR_{UK}$ interrogates the satellite network, to obtain data from $VLR_{SAT}$ 1 so as to obtain an appropriate routing number MSRN, according to conventional GSM roaming techniques, which is then dialled by the GMSC so as to direct the call on route b through PSTN 6 and gateway GW 1, to MSSC 1, from which it is routed through LES 1 and satellite 3a to the user terminal UT 1.

Thus, the PLMN 9 treats each $VLR_{SAT}$ as an additional VLR corresponding to an additional roamed network, in the same way that it treats a VLR corresponding to a roamed terrestrial network e.g. the aforementioned German GSM PLMN.

INTERWORKING FUNCTION

Referring again to FIG. 2, the satellite network may comprise the ICO™ system which can provide enhanced services not available through a conventional GSM or other land-based cellular network. For example, ICO™ system provides a high power notification (HPN) service which permits a temporary high power burst to be transmitted via one of the orbiting satellites in order to establish communication with a particular user terminal UT. The high power burst is at a signal strength higher than that normally used for data transmission, for the purpose of penetrating inside buildings and to other locations in which the signal strength may not normally be sufficient to maintain data communication. The purpose of the signal is to alert the user of an incoming call. For further details of the HPN service, reference is directed to our co-pending application GB 9624104.7 filed on Nov. 20, 1996.

Figure 8:
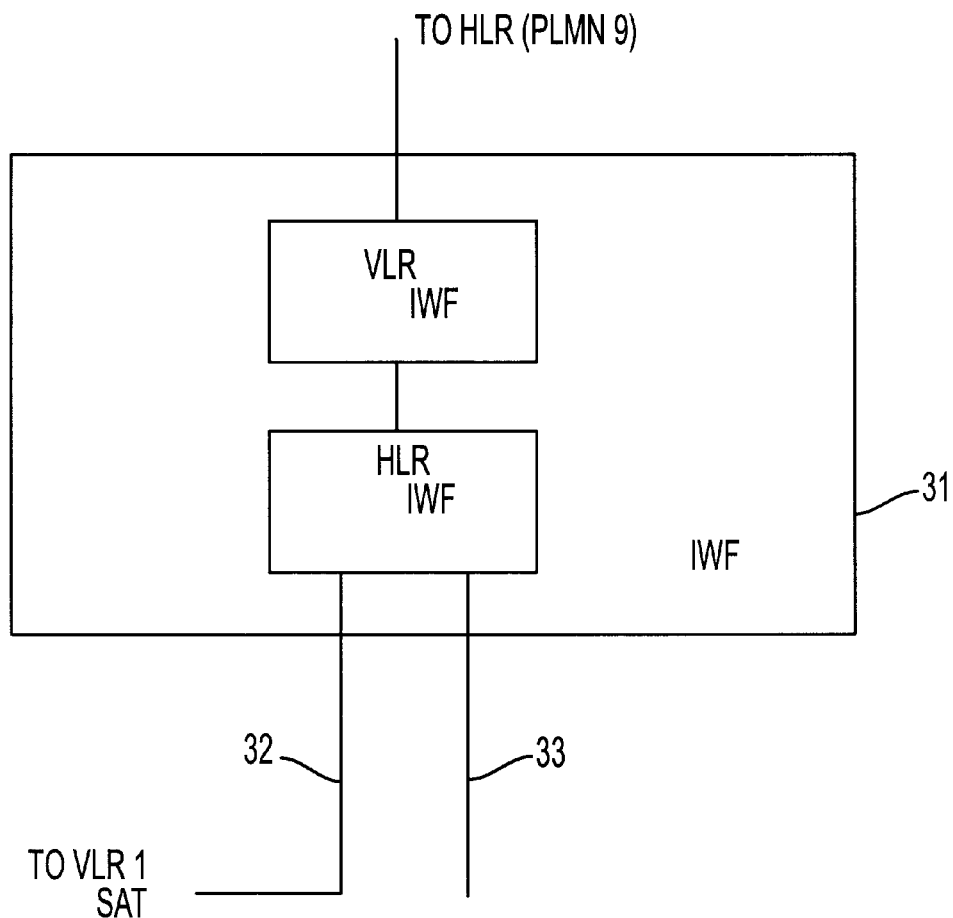
FIG. 8 is a schematic block diagram of the interworking function unit 31.

When the satellite network is used as an extension of the PLMN 9, and the additional satellite services are to be used, the system needs to maintain a record of which of the satellite services can be used by an individual subscriber. Referring again to FIG. 7, it will be seen that Table 1 keeps a record of the GSM based services available through PLMN 9 which can be used by an individual subscriber. In theory, it would be possible to reprogram Table 1 to include a list of additional services available to individual subscribers through the satellite network. However, in practice, it is not feasible to reprogram Table 1 in the HLR of the PLMN due to the fact that a large amount of reprogramming would be required. In accordance with the invention, an alternative solution is provided. An interworking function unit (IWF) 31 is coupled between the HLR of the PLMN 9 and the $VLRs_{SAT}$ of the satellite network, as shown in FIG. 2. The IWF 31 is shown in more detail in FIG. 8 and comprises a $VLR_{IWF}$ connected to the HLR of PLMN 9, together with a $HLR_{IWF}$ that is coupled to the individual $VLRs_{SAT}$ of the satellite network. In FIG. 8, the $HLR_{IWF}$ is shown coupled to $VLR_{SAT}$ 1 on line 32 and a schematic connection to the other $VLRs_{SAT}$ is shown as line 33.

A table of data is provided, corresponding to additional satellite services available for each subscriber registered to use them. An example is shown as Table 3 in FIG. 8. The Table provides a list of IMSIs for relevant subscribers together with a list of the corresponding satellite services for which they have registered for use. In the example shown in FIG. 8, IMSI A is registered for satellite services P, Q, R which are not available through the terrestrial GSM network 9.

Also, the $VLR/HLR_{IWF}$ maintains a record of the location of IMSIs currently registered with the $VLRs_{SAT}$ of the satellite network. In the example shown in Table 3, the IMSI A for UT 1 is shown registered at $VLR_{SAT}$ 1.

Considering now a situation in which the call from telephone 7 shown in FIG. 1 is to use one of the satellite services such as HPN, that is not available through the land-based GSM network 9. Prior to the call, the user will have registered with the $VLR_{SAT}$ 1. At that stage, the $VLR_{SAT}$ will have been loaded with a set of services specified by the $HLR_{UK}$ and in addition, a set of satellite specific services specified in the IWF 31. The call is routed to the GMSC at step S1 shown in FIG. 7, as previously described. The HLR of the PLMN 9 requests routing information from the currently registered location of the user, which for the purposes of the PLMN, is obtained from the IWF 31. The IWF 31 in turn, retrieves routing information from the currently registered $MSSC/VLR_{SAT}$. If the user is registered with the satellite network, MSSC checks with the $VLR_{SAT}$ to determine whether the relevant IMSI is registered for use with any satellite specific services e.g. service P (which may correspond to the HPN service). If the relevant IMSI is registered for use with the service, as shown in Table 3, the call is permitted to proceed. However, if the IMSI is not registered for use with the satellite service, the service is barred. It will be understood that these steps are carried out before initiation of a call, at the time of registration.

The described system has the advantage that no significant modification is required to the architecture of the HLR of an already existing PLMN. Furthermore, the IWF 31 can be configured for use with PLMNs which operate according to different standards. Thus, whilst the described example provides interworking with a GSM land-based network, the IWF can be extended for use with other conventional land-based networks such as AMPS, DAMPS, PHS or any other PLMN currently in use or envisaged.

Many other modifications fall within the scope of the invention. For example, whilst the invention is described in relation to the ICO™ satellite network, other satellite networks could be used, e.g. of the types discussed hereinbefore, with different satellite constellation and signal transmission protocols.

Also, whilst the signal communication on the paths 1, 2 utilises a TDMA access protocol, others could be used, such as code division multiple access (CDMA) or frequency division multiple access (FDMA).

Although for the sake of convenient explanation, the term "mobile" has been used to denote the user terminals UT, it should be understood that this term is not restricted to hand-held or hand portable terminals, but includes, for example, terminals to be mounted on marine vessels or aircraft, or in terrestrial vehicles. Also, it is possible to practice the invention with some of the terminals being completely or at least partially immobile.

What is claimed is:

1. Mobile telecommunications apparatus including:

a first mobile telecommunications network for use with a mobile user terminal for a subscriber to the first network, the first network including a home location register for maintaining a record of the network with which the subscriber is currently registered;

a second mobile telecommunications network to which the subscriber's user terminal can roam, the second network including at least one visitor location register with which the user terminal becomes registered when roaming to the second network, and the second network offering a service to the subscriber not available through the first network; and an interworking function unit has been for providing interworking between the first and second networks, including:

an interworking home location register to maintain a record of when the subscriber's user terminal becomes registered with a visitor location register of the second network and those of the services of the second network to which the subscriber is permitted access, whereby when the user terminal has roamed to the second network and registered with a visitor location register of the second network, the visitor location register is provided with data corresponding to said services to which access is permitted from the interworking function unit, and an interworking visitor location register coupled to the interworking home location register, the interworking visitor location register being operable to communicate to the home location register of the first network that the subscriber's user terminal has become registered with the visitor location register of the second network whereby when the user terminal has roamed to the second network and registered with the visitor location register of the second network, a call may be routed to the user terminal through the second network by being directed to the home location register of the first network such that the home location register obtains routing information through the interworking function unit for routing the call to the user terminal through the second network.

2. The apparatus according to claim 1 wherein the first network is selected from the group comprising a GSM, DAMPS,PHS, PDC and a UMTS network.

3. Apparatus according to claim 1 wherein the second network includes a plurality of visitor location registers and the interworking home location register is operable to keep a record of which of the visitor location registers with which the user terminal is registered.

4. Apparatus according to claim 1 wherein the first network comprises a land based mobile network and the second network comprises a satellite telecommunications network.

5. Apparatus according to claim 1 wherein the service comprises a high power notification (HPN) service.

6. A method of interworking between first and second mobile telecommunications networks, for use with a mobile user terminal for a subscriber to the first network which can roam to the second network, the first network including a home location register for maintaining a record of the network with which the subscriber is currently registered, the second network including at least one visitor location register with which the user terminal becomes registered when roaming to the second network, and the second network offering a service to the subscriber not available through the first network; the method comprising:

maintaining in an interworking home location register a record of when the subscriber's user terminal becomes registered with a visitor location register of the second network and those of the services of the second network to which the subscriber is permitted access, whereby when the user terminal has roamed to the second network and registered with a visitor location register of the second network, the visitor location register is provided with data corresponding to said services to which access is permitted, and maintaining an interworking visitor location register coupled to the interworking home location register, the interworking visitor location register being operable to communicate to the home location register of the first network that the subscriber's user terminal has become registered with the visitor location register of the second network whereby when the user terminal has roamed to the second network and registered with the visitor location register of the second network, a call may be routed to the user terminal through the second network by being directed to the home location register of the first network such that the home location register obtains routing information through the interworking function unit for routing the call to the user terminal through the second network.

7. An interworking function unit for providing interworking between first and second mobile telecommunications networks, for use with a mobile user terminal for a subscriber to the first network which can roam to the second network, the first network including a home location register for maintaining a record of the network with which the subscriber is currently registered, the second network including at least one visitor location register with which the user terminal becomes registered when roaming to the second network, and the second network offering a service to the subscriber not available through the first network; the interworking function unit comprising:

an interworking home location register to maintain a record of when the subscriber's user terminal becomes registered with a visitor location register of the second network and those of the services of the second network to which the subscriber is permitted access, whereby when the user terminal has roamed to the second network and registered with a visitor location register of the second network, the visitor location register is provided from the interworking function unit with data corresponding to said services to which access is permitted, and an interworking visitor location register coupled to the interworking home location register, the interworking visitor location register being operable to communicate to the home location register of the first network that the subscriber's user terminal has become registered with the visitor location register of the second network whereby when the user terminal has roamed to the second network and registered with the visitor location register of the second network, a call may be routed to the user terminal through the second network by being directed to the home location register of the first network such that the home location register obtains routing information through the interworking function unit for routing the call to the user terminal through the second network.

* * * * *